United States Patent
Lai et al.

(10) Patent No.: US 8,890,374 B2
(45) Date of Patent: Nov. 18, 2014

(54) UNINTERRUPTIBLE POWER SUPPLY SYSTEM FOR AVOIDING ARCING GENERATION AND CABINET THEREOF

(75) Inventors: Yuan-Fang Lai, Taoyuan Hsien (TW); Ying-Sung Chang, Taoyuan Hsien (TW)

(73) Assignee: Delta Electronics, Inc., Taoyuan Hsien (TW)

(*) Notice: Subject to any disclaimer, the term of this patent is extended or adjusted under 35 U.S.C. 154(b) by 929 days.

(21) Appl. No.: 13/040,887

(22) Filed: Mar. 4, 2011

(65) Prior Publication Data

US 2011/0234020 A1    Sep. 29, 2011

(30) Foreign Application Priority Data

Mar. 29, 2010 (TW) .............................. 99109464 A

(51) Int. Cl.
| | | |
|---|---|---|
| H02H 1/04 | (2006.01) | |
| H02H 3/22 | (2006.01) | |
| H04B 1/02 | (2006.01) | |
| H04B 15/02 | (2006.01) | |
| H02H 3/14 | (2006.01) | |
| H02J 9/06 | (2006.01) | |

(52) U.S. Cl.
CPC ... H02H 3/14 (2013.01); H02J 9/06 (2013.01)
USPC ................. 307/327; 307/45; 307/58; 307/82; 307/147; 363/65

(58) Field of Classification Search
CPC ..................................... H02H 1/00; H02J 1/00
USPC ......................................................... 307/326
See application file for complete search history.

(56) References Cited

U.S. PATENT DOCUMENTS

| | | | |
|---|---|---|---|
| 6,720,676 B2* | 4/2004 | Hasegawa et al. | 307/85 |
| 7,466,038 B2* | 12/2008 | Gaudreau et al. | 307/82 |
| 2003/0197428 A1* | 10/2003 | Hatton et al. | 307/82 |
| 2005/0127884 A1* | 6/2005 | Harris et al. | 323/282 |
| 2010/0157640 A1* | 6/2010 | Azuma et al. | 363/132 |

* cited by examiner

*Primary Examiner* — Jared Fureman
*Assistant Examiner* — Toan Vu
(74) *Attorney, Agent, or Firm* — Kirton McConkie; Evan R. Witt

(57) ABSTRACT

An uninterruptible power supply includes plural power units, plural output capacitor units, a capacitor energy bleeder circuit, plural output units, a detecting unit and a controlling unit. The capacitor energy bleeder circuit is electrically connected to the plural output capacitor units. The plural output units are connected with each other in parallel to issue the output voltage to the power output side and avoid returning electrical energy from the power output side back to the capacitor energy bleeder circuit. The detecting unit is used for detecting operating statuses of the plural power units. The controlling unit is used for controlling operations of the plural power units and the capacitor energy bleeder circuit. In response to a to-be-interrupted status of a specified power unit, the controlling unit controls the capacitor energy bleeder circuit to discharge electrical energy of the output capacitor unit corresponding to the specified power unit.

13 Claims, 4 Drawing Sheets

UNINTERRUPTIBLE POWER SUPPLY SYSTEM FOR AVOIDING ARCING GENERATION AND CABINET THEREOF

FIELD OF THE INVENTION

The present invention relates to a power supply system, and more particularly to an uninterruptible power supply (UPS) system for avoiding arcing generation.

BACKGROUND OF THE INVENTION

With increasing development of personal computers and networks, the services provided through networks are becoming more and more appealing in various applications. A data center is a facility used to house computers or servers. For providing intensive network applications, the numbers of computers or servers need to be increased. The precise electronic instruments and facilities installed in the data center need highly reliable power to maintain normal operations. Generally, an uninterruptible power supply (UPS) are widely used to provide uninterruptible and stable power. For example, the UPS becomes essential for network communication appliances, data centers and some important information appliances.

Generally, the uninterruptible power supply includes plural power modules that are connected with each other in parallel. If one of the power modules has a breakdown, the uninterruptible power supply may be normally operated. However, since the capacitance level of the output capacitor at the output side of the power module is very large, once the power module is replaced or removed from the uninterruptible power supply, the output capacitor has a residual voltage. In this circumstance, the user may get an electric shock if the user carelessly touches the power connector.

Moreover, for enhancing the operating efficiency, the output voltage of the power module should be increased to for example 400V. As known, the magnitude of the residual voltage of the output capacitor is in direct proportion to the output voltage of the power module. When the power module of the conventional uninterruptible power supply is replaced or removed, the high residual voltage may result in an arcing problem. For overcoming the arcing problem, the power connector used in the uninterruptible power supply should withstand high temperature and have good insulating properties in order to prevent the arching problem from temporarily damaging the power connector and avoid a short-circuited problem of the power connector. Since the power connector capable of withstanding high temperature and having good insulating properties are not cost-effective, the fabricating cost of the power module and the overall uninterruptible power supply will be increased. Moreover, during the power module is replaced or removed from the uninterruptible power supply, the electrical energy stored in the output capacitor is slowly discharged and exhausted. In other words, the conventional uninterruptible power supply fails to meet the power-saving requirement.

Therefore, there is a need of providing an uninterruptible power supply (UPS) system for avoiding arcing generation so as to obviate the drawbacks encountered from the prior art.

SUMMARY OF THE INVENTION

It is an object of the present invention to provide an uninterruptible power supply (UPS) system for avoiding arcing generation during the power module is replaced or removed.

Another object of the present invention provides an uninterruptible power supply system having reduced fabricating cost and meeting the power-saving requirement.

A further object of the present invention provides a cabinet having such an uninterruptible power supply system.

In accordance with an aspect of the present invention, there is provided an uninterruptible power supply system for avoiding arcing generation and providing a stable output voltage. The uninterruptible power supply includes plural power units, plural output capacitor units, a capacitor energy bleeder circuit, plural output units, a detecting unit and a controlling unit. The plural power units are used for converting an input voltage into the output voltage, and transmitting the output voltage to a power output side of the uninterruptible power supply system. The plural output capacitor units are electrically connected to output sides of respective power units. The capacitor energy bleeder circuit is electrically connected to the plural output capacitor units. The plural output units are electrically connected to the output sides of respective power units, so that the plural power units are connected with each other in parallel to issue the output voltage to the power output side and avoid returning electrical energy from the power output side back to the capacitor energy bleeder circuit. The detecting unit is used for detecting operating statuses of the plural power units. The controlling unit is electrically connected to the detecting unit, the capacitor energy bleeder circuit and the plural power units for controlling operations of the plural power units and the capacitor energy bleeder circuit. In response to a to-be-interrupted status of a specified power unit, the controlling unit controls the capacitor energy bleeder circuit to discharge electrical energy of the output capacitor unit corresponding to the specified power unit.

In accordance with another aspect of the present invention, there is provided a cabinet with an uninterruptible power supply system. The cabinet includes a power output side, plural compartments, a detecting unit and a capacitor energy bleeder circuit. The power output side provides an uninterruptible output voltage. The plural compartments are used for accommodating plural power modules, a controlling module and/or a battery module. The detecting unit is used for detecting operating statuses of the power modules. The capacitor energy bleeder circuit is electrically connected to output capacitor units of the plural power modules. In response to a to-be-interrupted status of a specified power module, the controlling module controls the capacitor energy bleeder circuit to discharge electrical energy of the output capacitor unit corresponding to the specified power unit.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
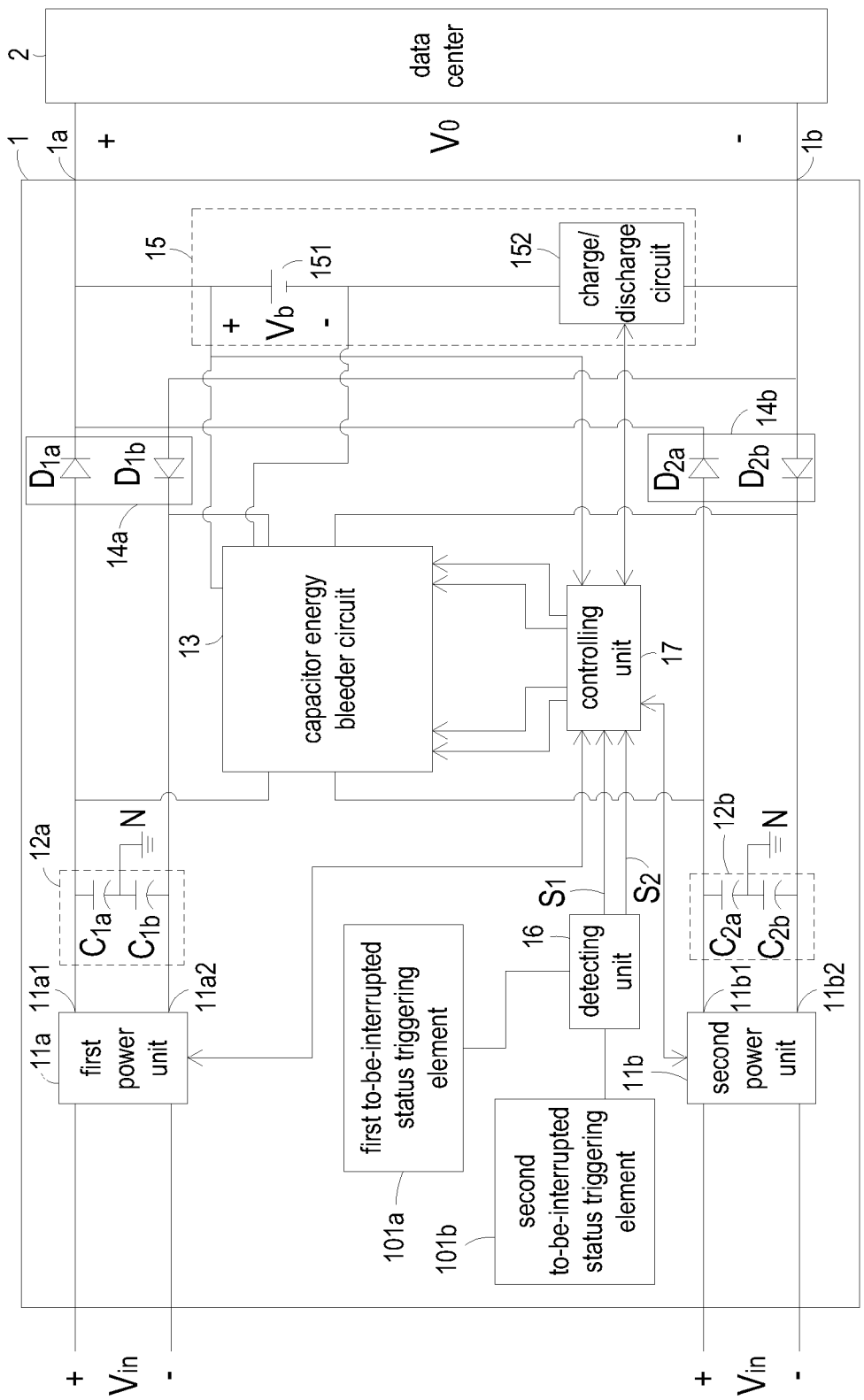
FIG. 1 is a schematic circuit diagram illustrating an uninterruptible power supply system for avoiding arcing generation according to an embodiment of the present invention.

The present invention provides an uninterruptible power supply (UPS) system for avoiding arcing generation. FIG. 1 is a schematic circuit diagram illustrating an uninterruptible power supply system for avoiding arcing generation according to an embodiment of the present invention. The uninterruptible power supply system 1 receives an AC input voltage $V_{in}$ from an utility power source (not shown), and outputs an uninterruptible high DC output voltage $V_o$ (e.g. 400V) to a data center 2 through the power output side (1a, 1b).

As shown in FIG. 1, the uninterruptible power supply system 1 includes a first power unit 11a, a second power unit 11b, a first output capacitor unit 12a, a second output capacitor unit 12b, a capacitor energy bleeder circuit 13, a first output unit 14a, a second output unit 14b, an energy storage unit 15, a detecting unit 16 and a controlling unit 17. The first power unit 11a and the second power unit 11b are used for receiving the AC input voltage $V_{in}$, and converting the AC input voltage $V_{in}$ into high DC output voltage $V_o$. The high DC output voltage $V_o$ is transmitted to the power output side (1a, 1b) of the uninterruptible power supply system 1. The first output capacitor unit 12a is electrically connected with the output side (11a1, 11a2) of the first power unit 11a in parallel. The second output capacitor unit 12b is electrically connected with the output side (11b1, 11b2) of the second power unit 11b in parallel. Each of the first output capacitor unit 12a and the second output capacitor unit 12b includes one capacitor or plural capacitors that are connected in series and/or parallel.

In this embodiment, the first output capacitor unit 12a includes a first positive output capacitor $C_{1a}$ and a first negative output capacitor $C_{1b}$. The first positive output capacitor $C_{1a}$ is electrically connected to a positive output terminal 11a1 and a neutral terminal N of the first power unit 11a. The first negative output capacitor $C_{1b}$ is electrically connected to a negative output terminal 11a2 and the neutral terminal N of the first power unit 11a. The second output capacitor unit 12b includes a second positive output capacitor $C_{2a}$ and a second negative output capacitor $C_{2b}$. The second positive output capacitor $C_{2a}$ is electrically connected to a positive output terminal 11b1 and a neutral side N of the second power unit 11b. The second negative output capacitor $C_{2b}$ is electrically connected to a negative output terminal 11b2 and the neutral side N of the second power unit 11b.

The capacitor energy bleeder circuit 13 is electrically connected to the first output capacitor unit 12a, the second output capacitor unit 12b, the energy storage unit 15 and the controlling unit 17. In response to a to-be-interrupted status of the first power unit 11a or the second power unit 11b, the electrical energy stored in the first output capacitor unit 12a or the second output capacitor unit 12b will be discharged by the capacitor energy bleeder circuit 13.

The first output unit 14a is electrically connected to the output side (11a1, 11a2) of the first power unit 11a. The second output unit 14b is electrically connected to the output side (11b1, 11b2) of the second power unit 11b. Since the first output unit 14a and the second output unit 14b are connected with each other, the high DC output voltage $V_o$ is transmitted to the power output side (1a, 1b) of the uninterruptible power supply system 1. Once the electrical energy stored in the first output capacitor unit 12a or the second output capacitor unit 12b is discharged, the first output unit 14a and the second output unit 14b can avoid returning the electrical energy from the power output side (1a, 1b) of the uninterruptible power supply system 1 back to the capacitor energy bleeder circuit 13.

In this embodiment, the first output unit 14a includes a first main diode $D_{1a}$ and a first minor diode $D_{1b}$. The first main diode $D_{1a}$ is interconnected between the positive power output terminal 1a of the uninterruptible power supply system 1 and the positive output terminal 11a1 of the first power unit 11a. The first minor diode $D_{1b}$ is interconnected between the negative power output terminal 1b of the uninterruptible power supply system 1 and the negative output terminal 11a2 of the first power unit 11a. Similarly, the second output unit 14b includes a second main diode $D_{2a}$ and a second minor diode $D_{2b}$. The second main diode $D_{2a}$ is interconnected between the positive power output terminal 1a of the uninterruptible power supply system 1 and the positive output terminal 11b1 of the second power unit 11b. The second minor diode $D_{2b}$ is interconnected between the negative power output terminal 1b of the uninterruptible power supply system 1 and the negative output terminal 11b2 of the second power unit 11b.

In some embodiments, the first main diode $D_{1a}$ and the first minor diode $D_{1b}$ of the first output unit 14a can be replaced by switch elements (not shown). Examples of the switch elements include but are not limited to bipolar junction transistors (BJTs), metal oxide semiconductor field effect transistors (MOSFETs), relays or insulated gate bipolar transistors (IGBT). The on/off statuses of the switch elements are controlled by the controlling unit 17. In a case that the first output unit 14a is not in the to-be-interrupted status and in normally operated, the switch elements of the first output unit 14a are conducted under control of the controlling unit 17. Whereas, in a case that the first output unit 14a is in the to-be-interrupted status, the switch elements of the first output unit 14a are shut off under control of the controlling unit 17. Similarly, the second main diode $D_{2a}$ and the second minor diode $D_{2b}$ of the second output unit 14b can be replaced by switch elements (not shown).

The energy storage unit 15 is electrically connected with the power output side (1a, 1b) of the uninterruptible power supply system 1. In this embodiment, the energy storage unit 15 includes at least one battery 151 and a charge/discharge circuit 152. The battery 151 and the charge/discharge circuit 152 are electrically connected with each other in series. The at least one battery 151 can include one or more serially-connected or parallel-connected batteries. In a case that the AC input voltage $V_{in}$ is normal but the residual capacity (or battery voltage $V_b$) of the battery 151 is insufficient, the controlling unit 17 will control the charge/discharge circuit 152 to operate in a charging mode, and thus a charging operation of the battery 151 is performed to store electrical energy. On the other hand, in a case that the AC input voltage $V_{in}$ is abnormal or interrupted, the controlling unit 17 will control the charge/discharge circuit 152 to operate in a discharging mode, and thus a discharging operation of the battery 151 is performed to continuously provide electrical energy to the data center 2.

The detecting unit 16 is electrically connected with the controlling unit 17. By detecting the operating statuses of the first power unit 11a and the second power unit 11b, the detecting unit 16 generates a first operating status signal $S_1$ and a second operating status signal $S_2$ to the controlling unit 17. According to the first operating status signal $S_1$ and the second operating status signal $S_2$, the controlling unit 17 can realize the operating statuses of the first power unit 11a and the second power unit 11b.

The controlling unit 17 is electrically connected with the detecting unit 16, the first power unit 11a, the second power unit 11b, the capacitor energy bleeder circuit 13 and the energy storage unit 15 for controlling operations of the first power unit 11a, the second power unit 11b, the capacitor energy bleeder circuit and the energy storage unit 15. In addition, in response to the to-be-interrupted status of the first power unit 11a or the second power unit 11b, the controlling unit 17 controls the capacitor energy bleeder circuit 13 to selectively discharge the electrical energy stored in the first output capacitor unit 12a or the second output capacitor unit 12b. In an embodiment, the capacitor energy bleeder circuit 13 includes power-consumption elements (e.g. resistors) to exhaust the electrical energy of the first output capacitor unit 12a or the second output capacitor unit 12b. Alternatively, the electrical energy of the first output capacitor unit 12a or the second output capacitor unit 12b could be recycled to the battery 151 of the energy storage unit 15.

For example, if the first power unit 11a and the second power unit 11b are not in the to-be-interrupted statuses and are normally operated, the first operating status signal $S_1$ and the second operating status signal $S_2$ are in the disabling statuses (e.g. at a low-level state). Meanwhile, the electrical energy of the first output capacitor unit 12a or the second output capacitor unit 12b is not discharged by the capacitor energy bleeder circuit 13. Whereas, in a case that the first operating status signal $S_1$ outputted from the detecting unit 16 in an enabling status (e.g. at a high-level state), the controlling unit 17 judges that the first power module 1011 is in the to-be-interrupted status. Under control of the controlling unit 17, the electrical energy stored in the first output capacitor unit 12a will be discharged by the capacitor energy bleeder circuit 13. As a consequence, once the first power unit 11a is removed, no arcing problem occurs.

Figure 2:
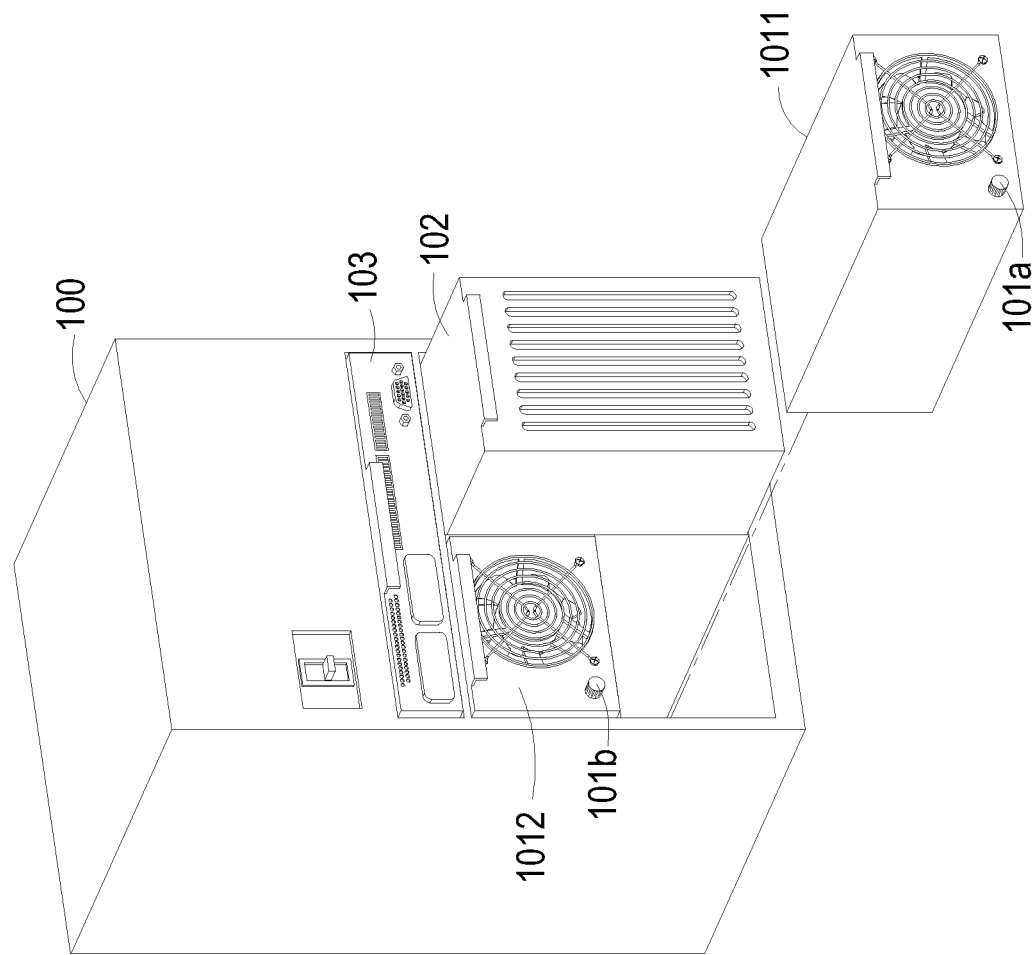
FIG. 2 is a schematic perspective view illustrating the outward appearance of an uninterruptible power supply system of the present invention.

FIG. 2 is a schematic perspective view illustrating the outward appearance of an uninterruptible power supply system of the present invention. Please refer to FIGS. 1 and 2. The uninterruptible power supply system 1 includes a cabinet 100, a first power module 1011, a second power module 1012, a battery module 102 and a controlling module 103. The cabinet 100 has plural compartments for separately receiving the first power module 1011, the second power module 1012, the battery module 102 and/or the controlling module 103. As such, the first power module 1011, the second power module 1012, the battery module 102 and/or the controlling module 103 are hot-swappable and can be easily replaced. In this embodiment, the first power module 1011 includes the first power unit 11a, the first output capacitor unit 12a and a first to-be-interrupted status triggering element 101a. The second power module 1012 includes the second power unit 11b, the second output capacitor unit 12b and a second to-be-interrupted status triggering element 101b. The battery module 102 includes the battery 151. The controlling module 103 includes the controlling unit 17. The cabinet 100 further includes the capacitor energy bleeder circuit 13, the first output unit 14a, the second output unit 14b, the charge/discharge circuit 152 and the detecting unit 16. In some embodiments, the first to-be-interrupted status triggering element 101a and the second to-be-interrupted status triggering element 101b are disposed on the cabinet 100. In some embodiments, the first output unit 14a and the second output unit 14b are not included in the cabinet 100, but the first output unit 14a and the second output unit 14b are respectively disposed within the first power module 1011 and the second power module 1012.

In this embodiment, the first to-be-interrupted status triggering element 101a and the second to-be-interrupted status triggering element 101b are locking elements. In a case that the first to-be-interrupted status triggering element 101a is unlocked, the first power module 1011 is detachably connected with the cabinet 100. In response to the unlocked status of the first to-be-interrupted status triggering element 101a, the detecting unit 16 generates the first operating status signal $S_1$ in an enabling status to the controlling unit 17. In response to the first operating status signal $S_1$ in the enabling status, the controlling unit 17 judges that the first power unit 11a is in the to-be-interrupted status. Under control of the controlling unit 17, the electrical energy stored in the first output capacitor unit 12a will be discharged by the capacitor energy bleeder circuit 13. Since the first output capacitor unit 12a has no residual charge, once the first power module 1011 is removed from the cabinet 100 to be repaired or replaced with a new one, no arcing problem occurs. Similarly, in a case that the second to-be-interrupted status triggering element 101b is unlocked, the second power module 1012 is detachably connected with the cabinet 100. In response to the unlocked status of the second to-be-interrupted status triggering element 101b, the detecting unit 16 generates the second operating status signal $S_2$ in an enabling status to the controlling unit 17. In response to the second operating status signal $S_2$ in the enabling status, the controlling unit 17 judges that the second power module 1012 is in the to-be-interrupted status. Under control of the controlling unit 17, the electrical energy stored in the second output capacitor unit 12b will be discharged by the capacitor energy bleeder circuit 13. Since the second output capacitor unit 12b has no residual charge, once the second power module 1012 is removed from the cabinet 100 to be repaired or replaced with a new one, no arcing problem occurs.

Figure 3:
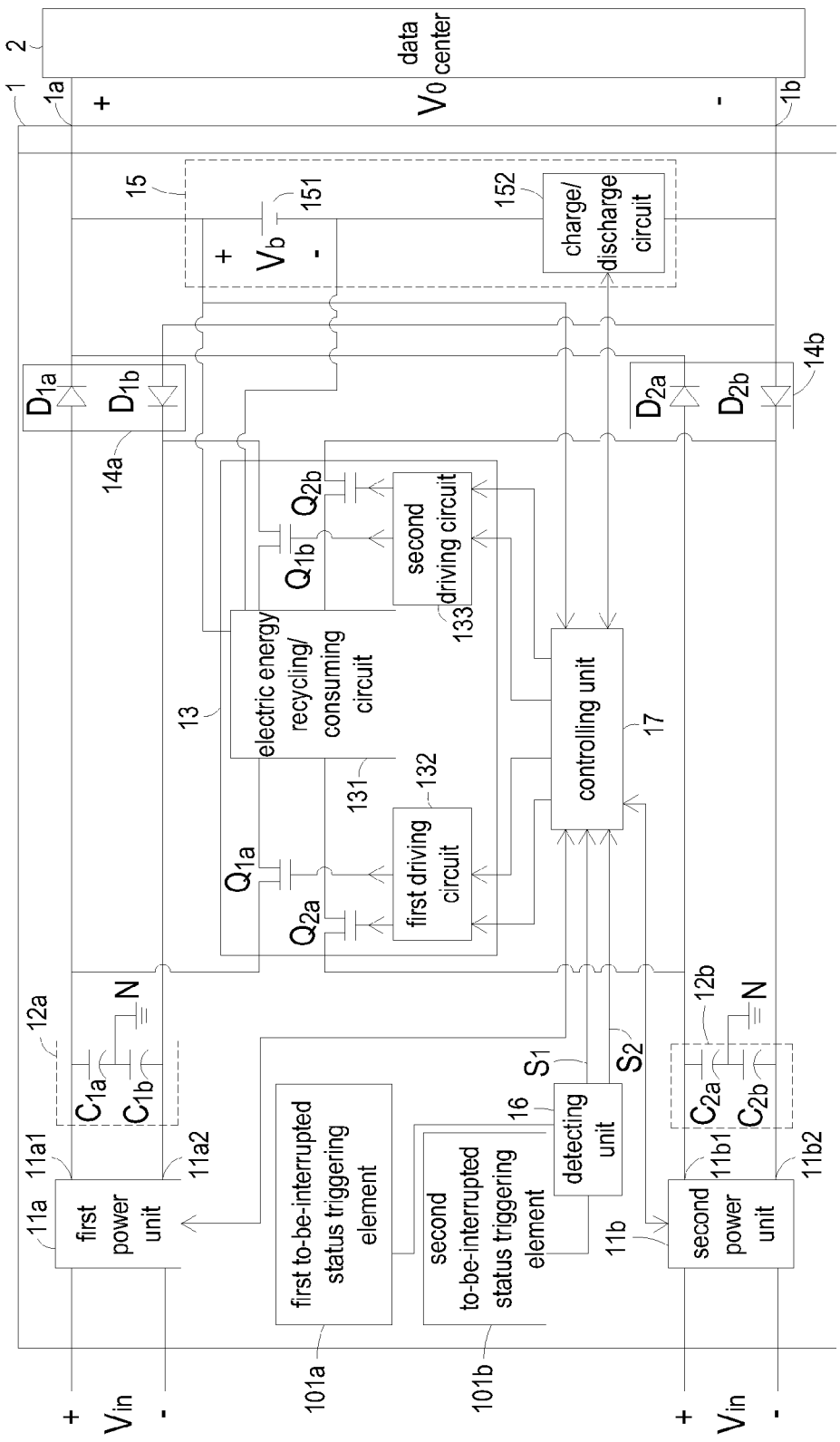
FIG. 3 is a schematic detailed circuit diagram illustrating the uninterruptible power supply system as shown in FIG. 1.

FIG. 3 is a schematic detailed circuit diagram illustrating the uninterruptible power supply system as shown in FIG. 1. As shown in FIG. 3, the capacitor energy bleeder circuit 13 includes a first positive switch element $Q_{1a}$, a second positive switch element $Q_{2a}$, a first negative switch element $Q_{1b}$, a second negative switch element $Q_{2b}$, an electric energy recycling/consuming circuit 131, a first driving circuit 132 and a second driving circuit 133. The first positive switch element $Q_{1a}$ is interconnected between the positive output terminal 11a1 of the first power unit 11a and the electric energy recycling/consuming circuit 131. The second positive switch element $Q_{2a}$ is interconnected between the positive output terminal 11b1 of the second power unit 11b and the electric energy recycling/consuming circuit 131. The first negative switch element $Q_{1b}$ is interconnected between the negative output terminal 11a2 of the first power unit 11a and the electric energy recycling/consuming circuit 131. The second negative switch element $Q_{2b}$ is interconnected between the negative output terminal 11b2 of the second power unit 11b and the electric energy recycling/consuming circuit 131. The first driving circuit 132 is electrically connected to the control terminals of the first positive switch element $Q_{1a}$ and the second positive switch element $Q_{2a}$ and the controlling unit 17 for turning on/off the first positive switch element $Q_{1a}$ or the second positive switch element $Q_{2a}$. The second driving circuit 133 is electrically connected to the control terminals of the first negative switch element $Q_{1b}$ and the second negative switch element $Q_{2b}$ and the controlling unit 17 for turning on/off the first negative switch element $Q_{1b}$ or the second negative switch element $Q_{2b}$.

For replacing the first power unit 11a, the detecting unit 16 generates the first operating status signal $S_1$ in the enabling status to the controlling unit 17. In response to the first operating status signal $S_1$ in the enabling status, the first positive switch element $Q_{1a}$ and the first negative switch element $Q_{1b}$ are conducted under control of the controlling unit 17. As such, the electrical energy stored in the first positive output capacitor $C_{1a}$ and the first negative output capacitor $C_{ab}$ will be transmitted to the electric energy recycling/consuming circuit 131 through the first positive switch element $Q_{1a}$ and the first negative switch element $Q_{1b}$ to be discharged. Similarly, for replacing the second power unit 11b, the detecting unit 16 generates the second operating status signal $S_2$ in the enabling status to the controlling unit 17. In response to the second operating status signal $S_2$ in the enabling status, the second positive switch element $Q_{2a}$ and the second negative switch element $Q_{2b}$ are conducted under control of the controlling unit 17. As such, the electrical energy stored in the second positive output capacitor $C_{2a}$ and the second negative output capacitor $C_{2b}$ will be transmitted to the electric energy recycling/consuming circuit 131 through the second positive switch element $Q_{2a}$ and the second negative switch element $Q_{2b}$ to be discharged. During the discharging process, the electrical energy of the first output capacitor unit 12a or the second output capacitor unit 12b will be exhausted by the capacitor energy bleeder circuit 13 or recycled to the battery 151 of the energy storage unit 15.

Figure 4:
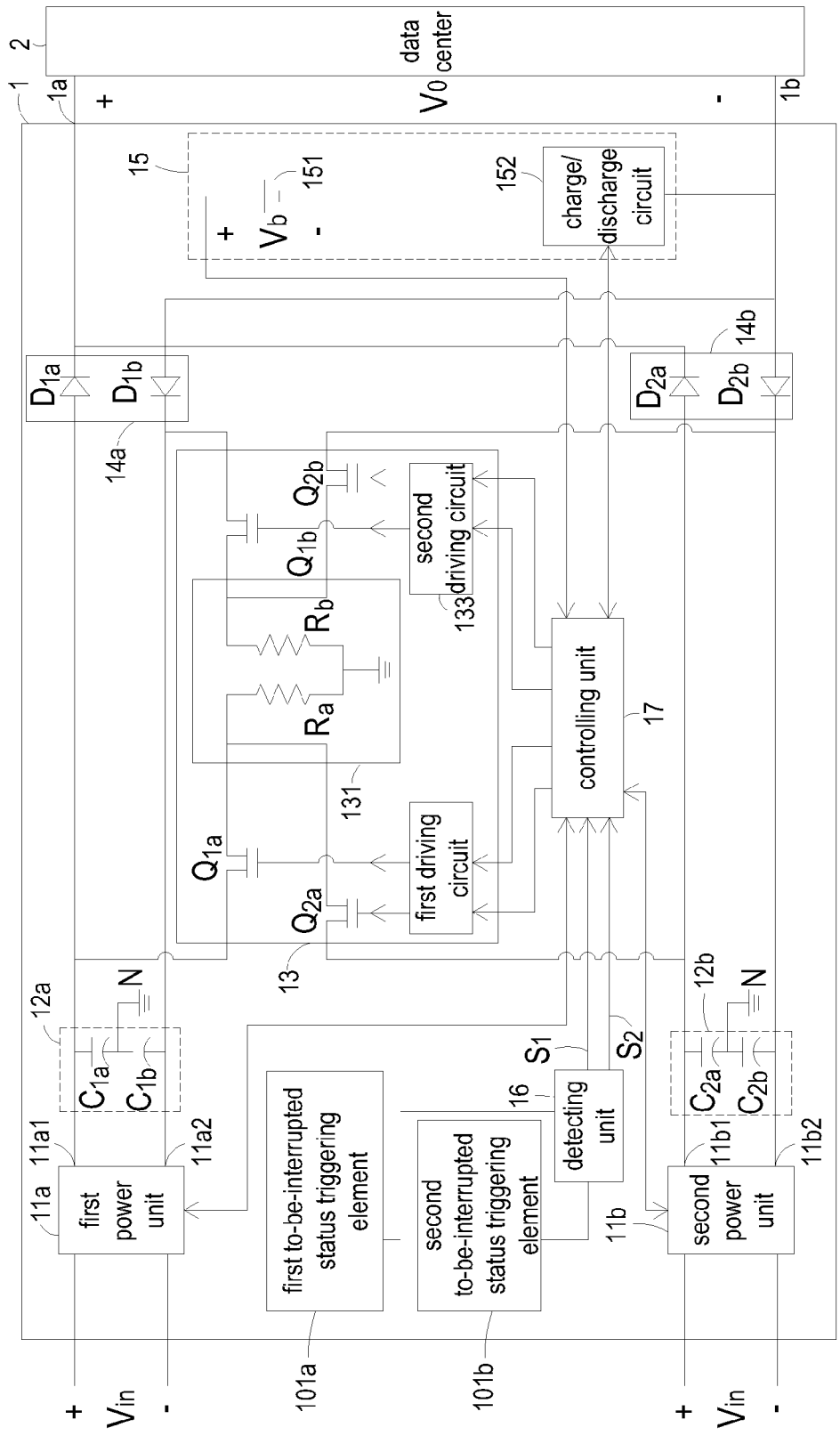
FIG. 4 is a schematic detailed circuit diagram illustrating an uninterruptible power supply system according to another embodiment of the present invention.

FIG. 4 is a schematic detailed circuit diagram illustrating an uninterruptible power supply system according to another embodiment of the present invention. As shown in FIG. 4, the electric energy recycling/consuming circuit 131 of the capacitor energy bleeder circuit 13 includes a first resistor $R_a$ and a second resistor $R_b$. The first resistor $R_a$ is electrically connected to the first positive switch element $Q_{1a}$, the second positive switch element $Q_{2a}$ and the neutral terminal N for exhausting the electrical energy stored in the first positive output capacitor $C_{1a}$ and the second positive output capacitor $C_{2a}$. The second resistor $R_b$ is electrically connected to the first negative switch element $Q_{1b}$, a second negative switch element $Q_{2b}$ and the neutral terminal N for exhausting the electrical energy stored in the first negative output capacitor $C_{1b}$ and the second negative output capacitor $C_{2b}$.

Examples of the switch elements $Q_{1a}$, $Q_{2a}$, $Q_{1b}$ and $Q_{2b}$ include but are not limited to relays, bipolar junction transistors (BM), metal oxide semiconductor field effect transistors (MOSFETs) or insulated gate bipolar transistors (IGBT). An example of the controlling unit 17 includes but is not limited to a micro controller unit (MCU) or a digital signal processor (DSP). In addition, the inventive uninterruptible power supply system isn't limited to be used in the data center environment. It is able to be used in where the power needs direct current application.

From the above description, before the power module is removed from the cabinet, the electrical energy stored in the output capacitor unit of the power module will be discharged and thus no residual charge is contained in the output capacitor unit of the power module. As a consequence, if the power module is removed, no arcing problem occurs and the possibility of carelessly getting an electric shock will be eliminated. Since no arcing problem occurs, the demand on the connector is no longer stringent, and the fabricating cost is reduced. Moreover, before the power module is removed, the electrical energy stored in the output capacitor unit of the power module can be recycled to the energy storage unit in order to achieve a power-saving purpose.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An uninterruptible power supply system for avoiding arcing generation and providing a stable output voltage, said uninterruptible power supply system comprising:
   plural power units for converting an input voltage into said output voltage, and transmitting said output voltage to a power output side of said uninterruptible power supply system;
   plural output capacitor units electrically connected to output sides of respective power units;
   a capacitor energy bleeder circuit electrically connected to said plural output capacitor units;
   plural output units electrically connected to said output sides of respective power units, so that said plural power units are connected with each other in parallel to issue said output voltage to said power output side and avoid returning electrical energy from said power output side back to said capacitor energy bleeder circuit;
   a detecting unit for detecting operating statuses of said plural power units; and
   a controlling unit electrically connected to said detecting unit, said capacitor energy bleeder circuit and said plural power units for controlling operations of said plural power units and said capacitor energy bleeder circuit, wherein in response to a to-be-interrupted status of any power unit of said plural power units, said controlling unit controls said capacitor energy bleeder circuit to discharge electrical energy of said output capacitor unit corresponding to said any power unit of said plural power units.

2. The uninterruptible power supply system according to claim 1, further comprising an energy storage unit electrically connected with said power output side, wherein electrical energy of said output capacitor unit corresponding to said specified power unit is exhausted by said capacitor energy bleeder circuit or recycled to said energy storage unit.

3. The uninterruptible power supply system according to claim 2, wherein said energy storage unit comprises:
   a battery; and
   a charge/discharge circuit electrically connected to said battery for charging/discharging electrical energy into/from said battery, wherein if said input voltage is normal but the residual capacity of said battery is insufficient, said controlling unit controls said charge/discharge circuit to operate in a charging mode, so that a charging operation of said battery is performed to store electrical energy, wherein if said input voltage is abnormal or interrupted, said controlling unit controls said charge/discharge circuit to operate in a discharging mode, so that a discharging operation of said battery is performed to continuously provide electrical energy.

4. The uninterruptible power supply system according to claim 1, wherein said capacitor energy bleeder circuit comprises:
   an electric energy recycling/consuming circuit; and
   plural positive switch elements electrically connected to positive output terminals of respective power units and said electric energy recycling/consuming circuit, wherein in response to said to-be-interrupted status of said specified power unit, said positive switch elements are conducted under control of said controlling unit, so that electrical energy of said corresponding output capacitor unit is transmitted to said electric energy recycling/consuming circuit to be discharged.

5. The uninterruptible power supply system according to claim 4, wherein said electric energy recycling/consuming circuit further comprises a first resistor, which is electrically connected to said plural positive switch elements for exhausting electrical energy of said output capacitor units.

6. The uninterruptible power supply system according to claim 4, wherein said electric energy recycling/consuming circuit further comprises a first driving circuit, which is electrically connected to control terminals of said plural positive switch elements and said controlling unit for turning on/off said plural positive switch elements.

7. The uninterruptible power supply system according to claim 4, wherein said capacitor energy bleeder circuit further comprises plural negative switch elements, which are electrically connected to negative output terminals of respective power units and said electric energy recycling/consuming circuit, wherein in response to said to-be-interrupted status of said specified power unit, said negative switch elements are conducted under control of said controlling unit.

8. The uninterruptible power supply system according to claim 7, wherein said electric energy recycling/consuming circuit further comprises a second resistor, which is electrically connected to said plural negative switch elements for exhausting electrical energy of said output capacitor units.

9. The uninterruptible power supply system according to claim 1, wherein said plural output units comprise switch elements and/or rectifiers.

10. A cabinet with an uninterruptible power supply system, said cabinet comprising:
   a power output side for providing an uninterruptible output voltage;
   plural compartments for accommodating plural power modules, a controlling module and/or a battery module;
   a detecting unit for detecting operating statuses of said power modules; and
   a capacitor energy bleeder circuit electrically connected to output capacitor units of said plural power modules,
   wherein in response to a to-be-interrupted status of any power module of said plural power modules, said controlling module controls said capacitor energy bleeder circuit to discharge electrical energy of said output capacitor unit corresponding to said any power module of said plural power modules.

11. The cabinet according to claim 10, further comprising plural output units, which are electrically connected to output sides of respective power units, so that said plural power units are connected with each other in parallel to issue said output voltage to said power output side and avoid returning electrical energy from said power output side back to said output capacitor units of said plural power modules.

12. The cabinet according to claim 10, wherein electrical energy of said output capacitor unit corresponding to said specified power unit is exhausted by said capacitor energy bleeder circuit or recycled to said energy storage unit.

13. The cabinet according to claim 10, wherein said capacitor energy bleeder circuit comprises:
   an electric energy recycling/consuming circuit; and
   plural positive switch elements electrically connected to positive output terminals of respective power modules and said electric energy recycling/consuming circuit;
   wherein in response to said to-be-interrupted status, said positive switch elements corresponding to said specified power module are conducted under control of said controlling unit, so that electrical energy of said output capacitor units of said plural power modules is transmitted to said electric energy recycling/consuming circuit to be discharged.

* * * * *